(12) United States Patent
Richardson (10) Patent No.: US 6,828,981 B2
(45) Date of Patent: Dec. 7, 2004

(54) METHOD AND APPARATUS FOR POLAR DISPLAY OF COMPOSITE AND RGB COLOR GAMUT VIOLATION

(75) Inventor: Michael Larsen Richardson, Reading, PA (US)

(73) Assignee: Videotek, Inc., Pottstown, PA (US)

( * ) Notice: Subject to any disclaimer, the term of this patent is extended or adjusted under 35 U.S.C. 154(b) by 316 days.

(21) Appl. No.: 09/726,093

(22) Filed: Nov. 29, 2000

(65) Prior Publication Data

US 2002/0063801 A1 May 30, 2002

(51) Int. Cl.$^7$ ................................................. G09G 5/02
(52) U.S. Cl. ....................................... 345/590; 345/603
(58) Field of Search ................................. 348/184–186; 345/590, 603

(56) References Cited

U.S. PATENT DOCUMENTS

| | | | |
|---|---|---|---|
| 4,503,545 A | | 3/1985 | Bremer et al. ................. 375/34 |
| 4,639,934 A | | 1/1987 | Zuranski et al. .............. 375/10 |
| 4,833,690 A | | 5/1989 | Zuranski et al. ................. 375/8 |
| 5,122,863 A | * | 6/1992 | Zortea .......................... 348/186 |
| 5,307,087 A | | 4/1994 | Baker ........................... 345/150 |
| 5,311,295 A | | 5/1994 | Tallman et al. .............. 348/180 |
| 5,519,440 A | | 5/1996 | Baker ............................ 348/186 |
| 5,589,877 A | * | 12/1996 | Ikuzawa et al. ............. 348/186 |
| 6,317,153 B1 | * | 11/2001 | Fasciano ....................... 348/177 |
| 6,504,551 B1 | * | 1/2003 | Takashima et al. ......... 345/649 |

\* cited by examiner

Primary Examiner—Jeffery Brier
Assistant Examiner—Motilewa Good-Johnson
(74) Attorney, Agent, or Firm—Duane Morris LLP (57) ABSTRACT

Video signal sample data that has three values in one color space definition can produce values that are out of range in another color space definition, namely color gamut errors. The invention produces a polar plot with superimposed or added color difference and/or primary color values as a function of hue, as in a vectorscope, but values that when combined by conversion or transcoding may produce gamut errors are combined in the inventive display. Thus, excursion over or under a predetermined limit value identifies the gamut error. The display includes or is switchable between color difference and primary color color space definition variables.

17 Claims, 5 Drawing Sheets

COMPOSITE LEGAL DISPLAY BLOCK DIAGRAM

METHOD AND APPARATUS FOR POLAR DISPLAY OF COMPOSITE AND RGB COLOR GAMUT VIOLATION

BACKGROUND OF THE INVENTION

1. Field of the Invention

The invention relates to the field of display and test equipment for video monitoring, production and the like, and in particular provides a method and apparatus whereby pixel display characteristics are illustrated in a manner that indicates compliance or violation of color gamut limitations applicable to the color space encoding technique being employed.

2. Prior Art

In color video display, a picture field is defined from an array of discrete picture elements. Each individual picture element or pixel comprises three primary-color portions, such as dots or short lines that are closely spaced. A cathode ray tube display, for example, has trios of red, blue and green phosphors. The current amplitude of an electron beam applied to the phosphors causes the red, blue and green dots at each pixel element to emit red, blue and/or green light, respectively. The specific proportion of light emission in the primary colors defines a full spectrum as well as black and white, and the colors of all the pixels in the field make up the picture display.

The signals that drive the light emissions in the primary colors can be encoded in a number of ways. The RGB encoding method provides separate red, blue and green signals, the respective amplitudes of which encode luminance, saturation and hue. Composite encoding uses luminance and color difference signals to encode the same variables of luminance, saturation and hue.

The signal characteristics that encode the different variables are obviously critical to the appearance of the picture. Video production and test equipment typically includes test pattern generators for exercising the video equipment in a predetermined way, and also test equipment such as a display, in which the color characteristics of the signal are illustrated. Such equipment usually includes a vectorscope for displaying information about the color portion of the video signal at any particular time, specifically, hue and saturation. The vector display is a two dimensional polar graph wherein the hue is represented by the angle of the displayed coordinate from the positive X axis, and the saturation is represented by the radius or distance from the origin. The color characteristics of each pixel correspond to a point on the vectorscope display.

Although the vector display is polar wherein angle defines hue and radius defines saturation, the vector display also can be considered simply an XY plot of two color difference components of the video signal. The X and Y ordinates or axes encode I versus Q for NTSC; U versus V for PAL, R-Y versus B-Y for analog component, and so on. The typical test pattern has several color bands wherein all the pixels in the band have given characteristics, and appears as a corresponding number of bright dots at different points in the vector display. A regular video program most often contains many varied combinations of color characteristics that change constantly and appear on the vector display as a changing indistinct shape.

There are three variables that encode the characteristics of a pixel in a display, such as red, blue and green amplitude in RGB, or luminance and two color difference values, for analog components. The three variables are sometimes referred to as a color space and the different encoding techniques are termed different color spaces. The characteristics of each pixel have particular values of three variables. If the variables are plotted as orthogonal axes, those pixel characteristics locate a point in a volume, hence a color space. The volume might be considered a rectilinear volume with mutually perpendicular sides, each of which extends from a minimum value to a maximum value of each of the three variables according to the color space being used. However, the definition of color is made more complex by a number of factors. There are differences in human perception of the respective primary colors whereby different ranges may be appropriate for different values. The three values in color space also are interrelated in some color space definitions, such as color difference definitions which are based on the difference or comparative levels of two colors. As a result of these and other factors, the allowable volume or universe of permissible points in a color space turns out to be an irregular volume within a rectilinear volume circumscribed by maximum and minimum values for each of the three variables in the color space.

To illustrate some of the potential complexity, in component digital video, the color space may be based on a fundamental luminance equation:

$$Ey=0.299Er+0.587Eg+0.114Eb,$$

which gives the luminance Ey in terms of the three primaries Er, Eg, and Eb. For the CCIR-601 standard, the two color components which are digitized are:

$$Cr=KCr*(Er-Ey),$$

and $$Cb=KCb*(Eb-Ey).$$

They are given by:

$$Er-Ey=0.701R-0.587G-0.114B$$

$$Eb-Ey=-0.299R-0.587G+0.886B$$

Luminance Y has a permitted range from zero to one. Differences Er−Ey and Eb−Ey have ranges +0.701 to −0.701 and +0.886 to −0.886. They are renormalized by applying coefficients:

$$KCr=0.5/0.701=0.713$$

and $$KCb=0.5/0.886=0.564$$

which gives re-normalized color differences $$ECr=0.500R-0.419G-0.081B$$

$$ECb=-0.169R-0.331G+0.500B.$$

Luminance Y often is quantized or digitized to 220 levels, that is, zero to 220, with "black" being at level 16 (i.e., luminance levels below 16 are blacker-than-black). The decimal value of Y prior to quantization is $$Y=219(Ey)+16$$

where Ey is the 0–1 range continuous version, and Y is either the nearest integer (8-bit version) or the fractional version with two bits of fractional value maintained (10-bit version).

Similarly, the color difference components are quantized to 225 levels with an offset or zero level equal to 128 which gives:

$Cr=160(Er-Ey)+128$ $Cb=126(Eb-Ey)+128.$

Often, the RGB components have the values 0–255, and the conversions used are:

$Y=0.257R+0.504G+0.098B+16$ $Cr=0.439R-0.368G-0.071B+128$ $Cb=-0.148R-0.291G+0.439B+128.$

In a video device or in a digital processor or other situation, it may be convenient for various reasons to employ a certain one of the encoding techniques for some purposes and a different encoding technique for other purposes. Thus in a color television receiver, for example, video is received and decoded from a composite signal. The receiver processes or converts the color information to separate R, G and B signals to modulate the electron beam current of three separate electron beam guns positioned to excite phosphor dots of the respective color.

A constant problem in video data processing, recordation and replay is encountered because there is a disparity between the allowable ranges of different component and composite color spaces. Combinations of values that are well within the allowed range of a color difference component video system, for example, may produce signal amplitudes that are well outside of the allowable ranges when the signal is transcoded or converted into its equivalent values in composite or RGB color space.

Excursions beyond the permissible bounds of color definition in one or another component or composite color definitions or color spaces are practically impossible to quantify by observing the signals on a waveform monitor. It is possible to envision a waveform monitor that processes video data by transcoding, for example, from color difference video format to RGB format, and then plots the resulting RGB values in a manner that shows when one or more of the transcoded R, G and B values goes out of permissible range. The operator (or other means) then can view or otherwise monitor the excursions directly, and can determine when the R, G and/or B values have gone out of range. Such a monitor still does not show directly which color(s) or component(s) of the source are causing the illegal excursion. Viewing the excursions that occur when a color difference format is encoded to a composite format is not possible. Yet these measurements are critical if a signal is to be correctly or legally encoded.

Specialty displays have been attempted. Tektronix, Inc. has proposed a display intended to assist in viewing relationships between color difference color space and RGB and composite color spaces. In one arrangement, shown for example in U.S. Pat. No. 5,307,087, a double diamond shaped display field is provided to represent the allowable or legal RGB limits (or "gamut") of a color difference signal. An arrowhead display to show composite excursions of a color difference signal is proposed in U.S. Pat. No. 5,519,440. U.S. Pat. No. 5,311,295 discloses a test device with a transcoder and gamut error detector and discusses comparators for generating a gamut error alarm. The disclosures of these references are hereby incorporated for their teachings regarding gamut errors and error detection.

It is a helpful diagnostic tool to know that a gamut error is occurring, namely that an encoded or transcoded signal is going out of limits. However, it would be even more helpful if a test apparatus could not only display excursions and indicate somehow (preferably visually) that legal limits are being exceeded, but also which carries information that is useful for identifying why the error is occurring.

SUMMARY OF THE INVENTION

It is an object of the invention to provide a display method and apparatus for conveniently and directly identifying the occurrence of a color gamut error in a signal, particularly upon transcoding of the signal between definitions or color spaces, and also providing information that associates a gamut error in one color space with variables in a different color space that can account for such error.

It is also an object of the invention to provide two forms of display of color characteristics of one or more pixels, one of the forms of display representing the color characteristics in a first color space and the other representing the characteristic in a second color space, wherein each of the first and second forms of display for one of said first and second color spaces carries information that represents the characteristics of said one or more pixels in the other of said first and second color spaces, whereby the displays assist in identifying the source of color gamut errors occurring in at least one of such color spaces.

These and other objects are accomplished by characterizing a sampled video input signal in two different color space definitions, such as a color-difference color space and a primary-color color space. Certain values that are legal in one of the color spaces, for example the color difference space, can produce primary color amplitudes that are out of legal color gamut range. Such gamut violations are indicated according to the invention using a polar plot in which phase angle corresponds to hue as in a vectorscope. The color difference and/or primary color values in either or both color spaces are depicted as ranges of radii in the polar plot, which are compared to circular limit lines that can represent the legal gamut limits. In color difference color space, the signal excursion is plotted as a function of hue phase angle, producing radially inner and outer values in a plot. The excursion is calculated or processed as luminance plus and minus saturation as a function of hue phase angle. In primary color color space, the amplitudes or excursions of the three primary color components are plotted as separate radii as a function of hue phase angle, also producing radially inner and outer values (except at black and white, where the component amplitudes are equally at the maximum or minimum). The plot or the display is provided with concentric lines showing the maximum and minimum legal gamut values, the minimums preferably shown with an offset whereby values below a minimum or negative values are plotted inside an inner circle but at the correct phase angle. By this plotting as a function of hue in two alternative or simultaneous color space plots, the display is useful for assisting in identifying the underlying reason for gamut violations which may occur. This processing and display technique is readily useful to persons familiar with vectorscope displays, particularly if the information is plotted by the same hue phase angle, providing a useful visible measure of the characteristics of a video signal.

A number of other objects and attributes of the invention will be made apparent by the following discussion of certain practical embodiments and examples.

BRIEF DESCRIPTION OF THE DRAWINGS

There are shown in the drawings certain embodiments of the invention as presently preferred. It should be understood that the invention is not limited to the precise arrangements and instrumentalities shown as examples, and wherein.

DETAILED DESCRIPTION OF THE PREFERRED EMBODIMENTS

Two novel forms of display are provided according to the invention, and in the preferred arrangement, both are forms of polar display, that is plots or graphs that contain information encoded by the radius from an origin to a point and also by the angle of that radius. The preferred displays also use a plurality of concentric circles to display graduation lines (graticules) or thresholds such as legal color gamut limits or arbitrary threshold values selected by an operator. Due to the polar format and concentric circle lines, the displays may be called bull's eye displays, annular displays or the like. However it should be appreciated that the invention is applicable to other types of graphs such as Cartesian rather than polar plots and other manners of displaying values besides concentric circles.

The displays according to the invention are apt as items of video production test equipment, for use during recordation, playback, transmission, digitization, compression and similar uses. At least one of the displays is used, namely for plotting the signal attributes in at least one color space. The colors that are encoded in a video signal are represented according to the invention by preferably-polar plots, including variations in radii and in relative phase angles around an origin.

According to an aspect of the invention, the respective color characteristics of a source or input signal are encoded as certain composite and/or component color space spans or ranges between spaced values. These ranges can be displayed by presentation of radially plotted points at the same phase angles for the respective colors as might be used with a vectorscope display. The display of spans instead of discrete values, for each pixel that is encoded in the display, has been found to be a useful tool for identifying and diagnosing color gamut errors.

By use of one of the forms of display as described herein, and preferably by using both forms of display either simultaneously or by user selection to present signal color variations in composite and component color spaces, illegal values in at least one of the color spaces are shown by the display, including values which may be valid and legal in one color space (composite or component) but not in another. The displays assist in identifying the culprit variables in one of the respective color spaces that are forcing the transcoded or otherwise corresponding values in the other color space to fall out of legal bounds.

Figure 1:
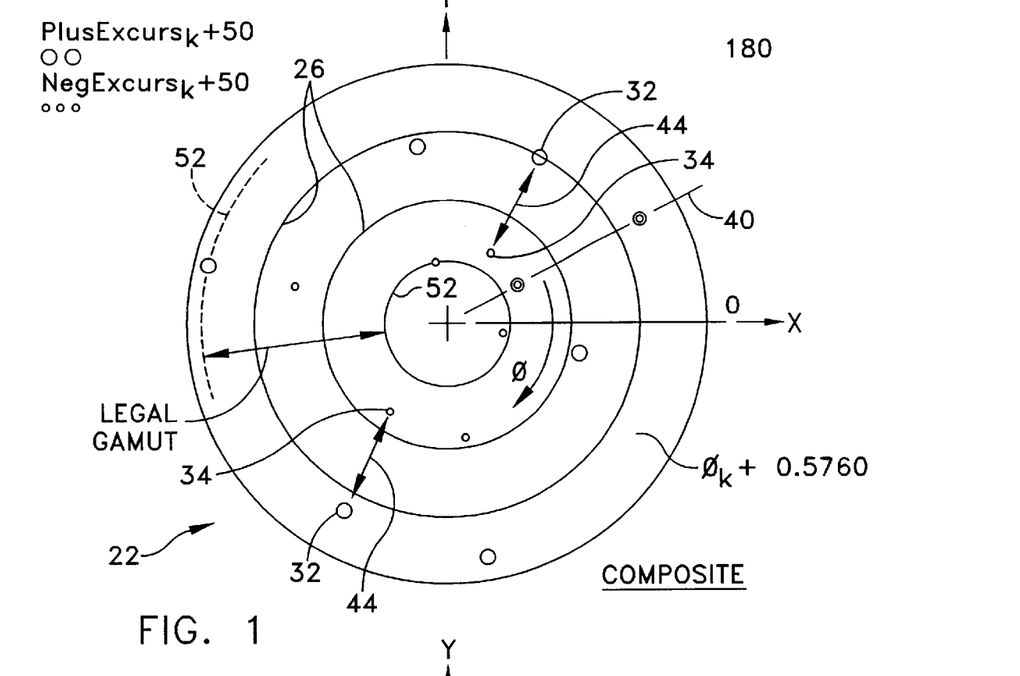
FIG. 1 is a display of composite color information according to the invention, in particular illustrating the color characteristics of an exemplary 100% test bar standard test pattern screen.
Figure 2:
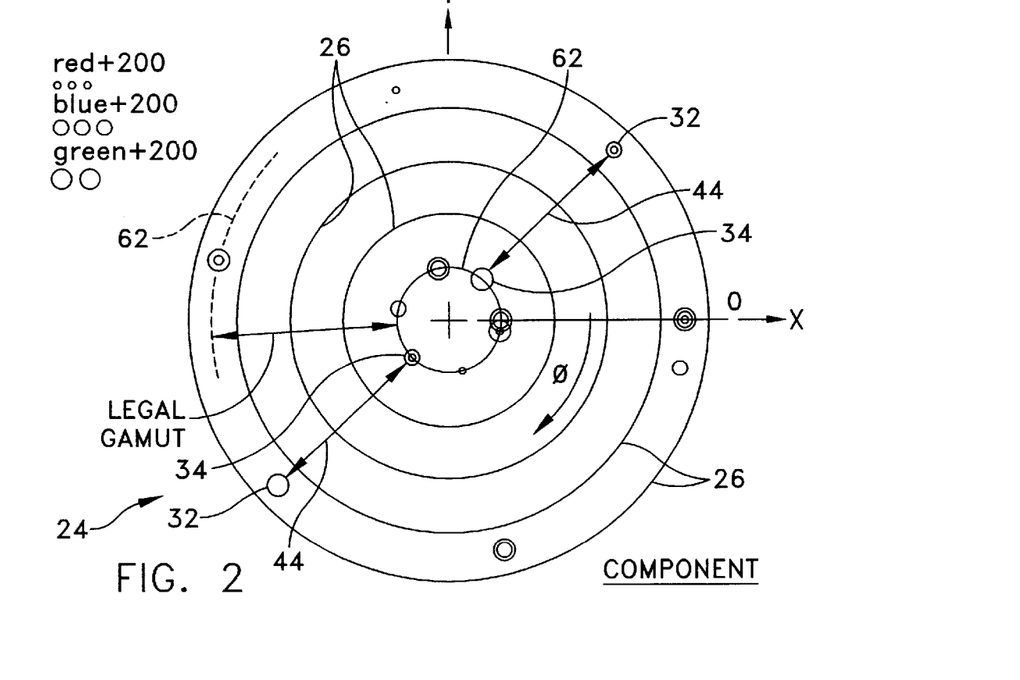
FIG. 2 is a display of RGB component color information according to the invention, illustrating the color characteristics of the same test pattern as in FIG. 1, except using the component information display of the invention.

A polar composite signal data display 22 is shown in FIG. 1. The display 22 is arranged to represent picture color data and to illustrate compliance or non-compliance with a range of legal values in a first color space. In FIG. 1 the color space is composite color space using luminance and color difference Y, Cr, Cb as the variables defining plotted points. A second display 24 is shown in FIG. 2 and is arranged to represent the color data of the same picture, and likewise to illustrate compliance or non-compliance with a range of legal values, except using a different color space to encode the video variables. Display 24 uses component color space in which the plotted points are the amplitudes or component signals R, G and B.

Various combinations of two color spaces are possible. However, where the first display 22 shows a composite color space, the second display is advantageously a component color space such as the amplitudes of the three primary colors, R, G, B. As discussed below, these forms of presentation of the characteristics of the same color signal, identify colors or color combinations or color-related differences, that present problems in that values that are out of predetermined limits in at least one of the component or composite color spaces are sometimes produced when equal video data points are converted by routine mathematical conversion from one color space to the other.

The predetermined limits are preferably the range or gamut of legal values according to the technique used to display color characteristics in one such color space. The gamut or range of values preferably conforms to industry specifications, but it is also possible to use non-standard gamut or range limitations, for example in order to comport with limitations of a particular apparatus or process that may differ from standard. Hardware and possibly software components that are intended to process and display a particular type of color signal typically are made capable of handling only an expected range of legal data values, on the assumption that illegal values outside of the expected range will not occur. If illegal values are encountered, various unintended results may accrue. For example, amplifiers may be over driven and may saturate. Power supplies may become overloaded and pull down supply voltages. Digital registers and/or mathematical processes may overflow, causing outputs to swing widely or change polarity. Illegal values also sometimes cause less dire consequences that are nevertheless undesirable. For example, even if illegal values produce signal attribute values that are within the capability of the various signal processing components to handle and display, the end results may be different than the results that were intended.

Gamut errors can occur when there is any data transformation, not limited to transcoding between color space definitions. Transcoding often is the cause of gamut errors because an operator who only processes video in one color space may have no reason to suspect a gamut error because the data is entirely legal in the color space used. Image processing systems using computer graphics systems, which are sometimes used to insert text or effects into a video program, have numerically defined color limited only by the number of bits used in the display memory. It cannot be safely assumed that a value validly encoded and operable in one color space will produce a legal value in another color space, particularly when transcoded through a composite color space.

Video data can be converted between color spaces numerically on a pixel-by-pixel basis at regular transmission speeds, for example as in U.S. Pat. No. 5,737,032—Stenzel et al., which is hereby incorporated. It is possible as a part of a calculation or transposition to force the output values to comply with applicable limits, for example to limit all values above a legal limit to the full scale legal limit value. However, this alters the color parameters and is not helpful in determining the source of the gamut errors. In fact, such limitations may mask gamut error problems.

The present invention permits the values to be examined for compliance with threshold limits using any of the possible color spaces as the test color space. The predetermined limits can be the full legal gamut in the test color space, or the invention can be applied if desired to other limits such as arbitrary limits set by the user, such as a given percentage of full scale.

Assuming that input devices are working properly, gamut errors generally are not found in original input data. Errors typically occur when data that has been encoded in one color space, presumably (but not necessarily) with legal values, produces values that are off scale in an alternative color space, when the original data is routinely converted such that the same input data is encoded in a different color space. At least one second color space definition, which is not associated with the predetermined limits of the test color space, can be termed the alternative color space. The alternative color space may have its own predetermined limits or gamut of legal and illegal values. In that case the invention may be usefully applied in either direction, namely when either one of the composite and component definitions is the test subject and the other is the alternate, or vice versa.

According to the invention, the displays depict the value of the test subject color data in the test color space, preferably with markers such as graticules or reference lines for showing graphically whether the data values exceed the predetermined limits. The display identifies which color or colors or component value(s) or composite value(s) in the test color space are out of limits and assists in determining the aspects of the signal encoded in the alternative color space that are causing the illegal excursion in the test color space.

The predetermined limits can have both maximum and minimum values. Thus the display in the test color space and the alternative color space are useful to show whether the excursions in the respective color space are above or below allowable limits. This is preferably accomplished even though, for example, the lower limit may be zero, by an offset that is placed on the data as displayed.

A composite legal display 22 according to the invention is shown in FIG. 1. This display 22 has certain characteristics in common with a standard vector display (see FIG. 7) in that composite display 22 also is a polar plot. The standard vectorscope display is an X-Y plot of two color difference components (I vs. Q for NTSC; U vs V for PAL; R-Y vs. B-Y; etc.). Thus the particular color (wavelength) or hue is identified by the phase angle at which a plotted point is presented. In FIG. 1, the phase angle is measured clockwise relative to a reference or zero phase angle 40. In the embodiment shown, the zero phase angle, which corresponds to black and white, precedes the positive X axis by about thirty degrees. The plotted phase angle is $\phi_K$+0.576 radians.

In a vectorscope, the radius of the polar plot to a particular represented point is a function of saturation. According to the invention, a variable equal to the excursion or span of the composite signal is graphed in a polar manner as a function of color phase angle. This provides a form of representation of luminance as well as saturation, as discussed below, and thus is useful in assessing whether or not the values in that color space are legal values, namely values that fall between predetermined maximum and minimum values.

The composite legal display 22 of the invention need not, and as shown in FIG. 1 preferably does not, employ a zero origin for the magnitude portion of the polar display. Instead, the data values are plotted with an offset. The upper and lower amplitude limits are shown by reference marks, such as concentric circles as shown. These limits represent the highest and lowest allowed excursions, namely the limits of the luma, plus and minus chroma, and are expressed in composite video quantized units.

In a composite Y, Cb, Cr video signal, the luminance resembles a dc offset value and the saturation is the peak to peak amplitude of the chroma or modulation at the color burst frequency. The amplitude of the composite signal, as synchronized to the color burst, is phase aligned with the horizontal scanning frequency of a color CRT, so as to cycle through the primary colors at each pixel position in sequence with scanning over the respective primary color phosphors. Similar synchronization in handling of a composite signal is also employed in other types of receivers and color displays capable of processing composite video.

According to the invention, the displayed point magnitudes are calculated directly from the values of the composite video. Referring to FIG. 1, two points are determined at each plotted color phase angle, namely one point for the upper excursion or highest value 32 at the applicable color phase angle, and one for the lower excursion or minimum value 34. Saturation or peak-to-peak amplitude is calculated first, namely by determining the square root of the sum of the squares of the color difference signals Cb, Cr. The saturation value is divided by two. The upper excursion point 32 is determined by adding half the saturation value to the luma Y value 55 (see FIG. 8). The lower point is calculated by subtracting half the saturation from the luma Y. The excursion points correspond to the radius of the polar graph of the invention, adjusted by an offset described below. The phase angle for the two excursion points (the upper point 32 and the lower point 34) is derived from the two color difference signals Cb, Cr, as in a standard vector display, where one of the color difference signals is proportional to the Cartesian coordinate X axis displacement and the other is proportional to the Y axis displacement. Points with little or no saturation have a luma but no chroma (they are black, gray or white). These points can be displayed as circular rings, thereby encompassing all phase angles and all hues, or as shown in FIG. 1 can be shown as dots along an arbitrary phase angle such as the positive X axis or another predetermined angle.

For black, gray and white, luma could be represented as a point on a reference "no chroma" axis. That axis could be repeated at angular intervals, or could be placed at a particular angle such as the zero phase angle or the information can be presented as a circle around the origin. In another arrangement, an angular gap for a no-chroma axis can be provided between 360° and 0° color phase angles. The illustrated display does not necessarily need to be contiguous over the span of phase angles.

Figure 8:
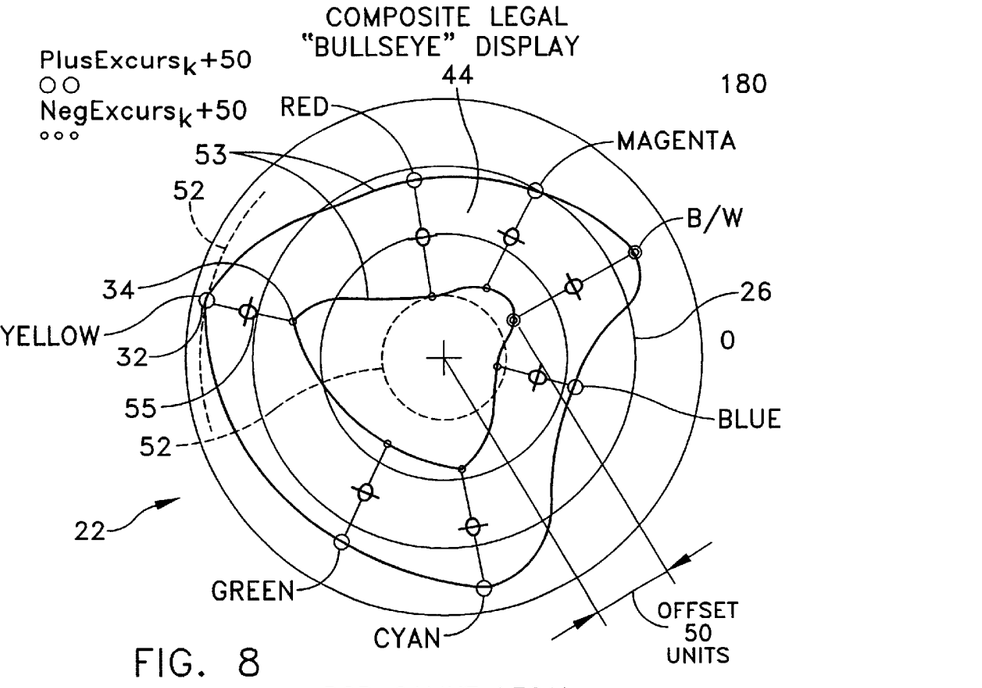
FIG. 8 is a copy of the composite display of legal color values in FIG. 1, labeled and marked with certain reference points for discussion of the attributes displayed.

In a video program that repetitively passes through a wide variety of different luminance, saturation and hue values, as is typical of many forms of programming, a phase-contiguous display appears as a wide annular outlined band having a thickness representing the extremes of excursion due to variations in luminance and saturation at the particular hue phase angle. FIG. 8 shows the resulting composite wide band that would result if all color combinations were passed using the same luminance versus hue relationships as in a test pattern (i.e., with saturation from a minimum up to a maximum equal to that of the test pattern. The values all reside between maximum and minimum legal values which can be drawn as circles 52. According to the invention, all the values must fit between the indicator lines, graticules or similar markers 52 showing the legal maximum and minimum excursions. Thus the invention plainly indicates when the maximum and minimum amplitudes (the excursions) extend out of bounds at a particular color phase angle.

FIG. 2 similarly shows the same colors but uses RGB primary color component color space. This presentation has maximum and minimum values 62 in the same manner as FIG. 1, and plots the amplitude values of the individual primary colors R, G, B as a function of hue phase angle.

Figures 5, 6, 7:
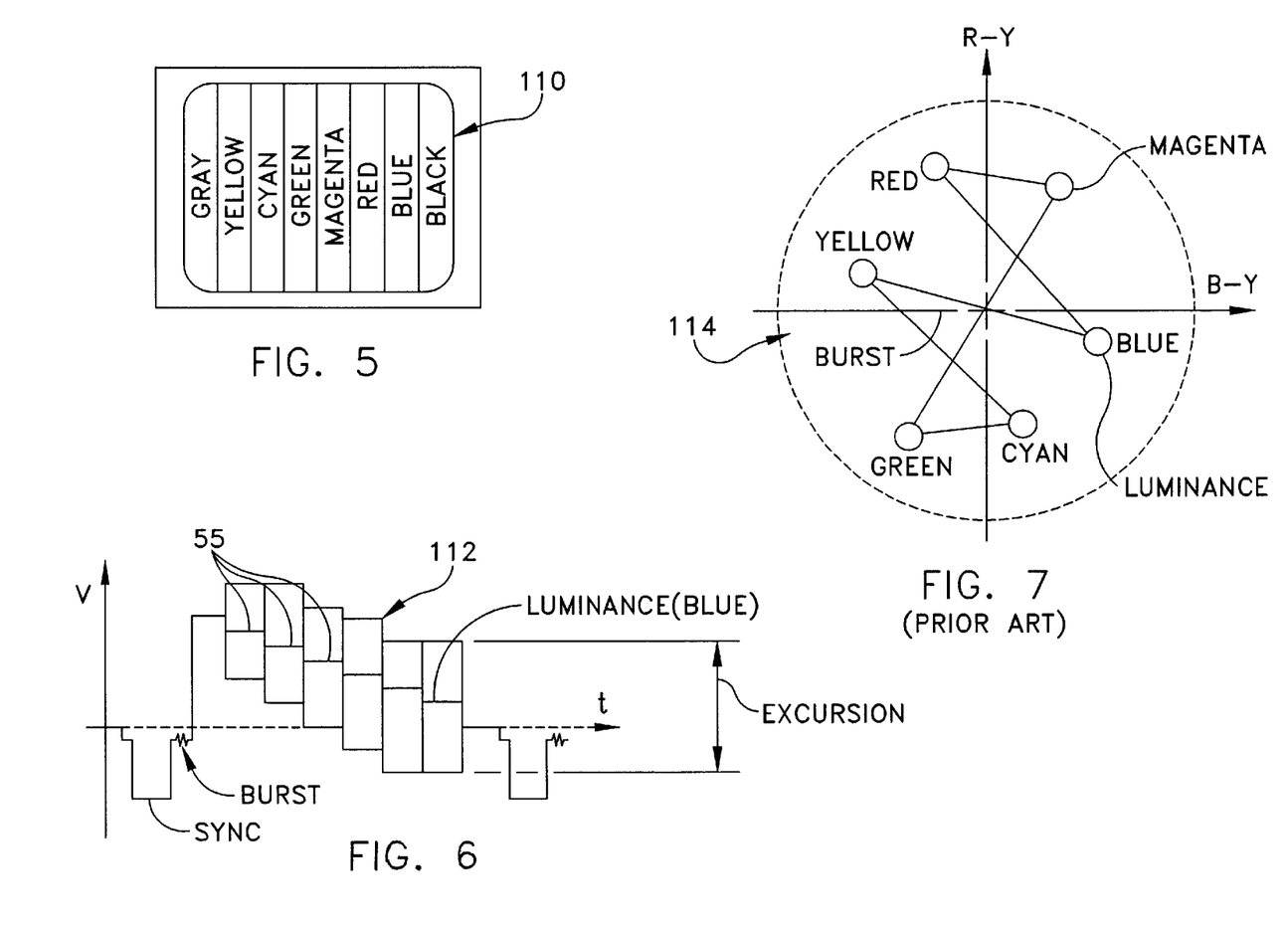
FIGS. 5, 6 and 7 illustrate a standard 100% test bar pattern as displayed in colored bars (FIG. 5), by composite signal amplitude (FIG. 6) and as displayed on a standard vectorscope display (FIG. 7), respectively.

In FIGS. 1 and 2, the plots have isolated data points or spots plotted at inner and outer radii, which correspond to the dots which would be produced by a test pattern (see also FIGS. 5–7). A test pattern contains a number of vertical bands in which the luminance, saturation and hue values are constant, thereby producing one set of Y, Cb, Cr values for each of the color bars (e.g., six bars plus black/white). The standard color bar display has three bars for the individual primary colors, three bars for intermediate colors using two of the three primary colors, and the no-chroma gray/white and black bands. In FIG. 1, the excursion data points comprise six pairs of excursion points 32, 34 at angularly spaced positions around an the origin, and four points for gray/white and black, namely two at the maximum luminance (gray/white) and two at the minimum luminance (black), in this case shown at a zero phase line 40.

The upper and lower legal limit values 52 (FIG. 1) or 62 (FIG. 2) can be shown as radially inner and outer circles. Preferably the limit lines are shown in a different color than the data values. The upper and lower limits can be reference lines or graticules that are permanently shown on the display screen. Alternatively the upper and lower limits can be represented by circular lines that are generated in the display field together with the plotted data points.

It is possible to generate the displays of the invention by applying the results of calculations to a D/A converter that drives the X and Y inputs of a cathode ray tube display. In that case the color difference components are proportional to the X and Y displacements that are plotted. Advantageously, however, the displays of the invention are generated logically by composing the appropriate image in a VGA display memory that is displayed using a computer monitor or other noninterlaced display, for example as in U.S. Pat. No. 6,069,607. In that event, programming changes can readily change the upper and lower legal limits that are displayed, for example to permit the user to specify limits, or change the colors of the displayed points or the limit lines or otherwise adapt the display of the invention to a particular situation.

In FIG. 1, the display according to the foregoing example is shown as it appears when depicting 100% color bars (i.e., full height color bars of maximum luminance and saturation for each color) as the source signal. FIG. 2 illustrates an alternative color space display, in this case using R, G and B component values instead of the composite value display of FIG. 1. Like the composite legal value display, the RGB component legal value display also plots points in a polar fashion between two concentric limit circles. The limits in this display are component video amplitude limits 62, for example with radial distance being proportional to voltage in a millivolt units scale. The legal limits may be, for example zero and 700 mV. The hue or phase angle for the displayed points is again derived from the two color difference signals as done in an ordinary vector display.

To display component RGB video data from a source in composite YCBCR color difference format, the data is transcoded from YCBCR to RGB. Each set of three component samples (i.e., R, G and B) produce a set of three corresponding amplitude points in the display. The three points are located at a phase angle defined by the color in the same manner as the vector display, but each sample has three values instead of two, namely one each for the red, blue and green primary colors. Each component point that is plotted can be represented in its corresponding component color, i.e., red dots for R, green dots for G and blue dots for blue. Alternatively the different color components can be distinguished by dot size as in FIG. 2 or otherwise.

Typically, the upper RBG limit is 700 mV and the lower limit is 0.0 mV. However, it may be desirable in a particular situation to use different limits. The color difference signals are used to determine the angle for each set of display points in component RGB display 24 in FIG. 2, and the R, G or B amplitude is represented by the radius.

In FIG. 2, the display shows the same 100% color bar (i.e., full height color bars at maximum luminance and saturation) as the source signal used in FIG. 1. FIGS. 1 and 2 represent alternative displays for the same source signal. However, the displays are apt for the alternatives of a composite signal (namely the color differences in FIG. 1) and a component signal (namely the R, G and B components in FIG. 2).

The displays of FIG. 1 and FIG. 2 have both upper and lower limits, which can be represented by concentric circles or by other shapes 52 or 62. If a maximum excursion 32 (FIG. 1) or the highest R, G or B amplitude (FIG. 2) exceed the upper limit, then the corresponding point is plotted radially outside of the outer limit line. For the radially inner limit, the lower limit could be zero, as in the R, G and B component data, which legally ranges from zero to 700 mV.

According to an inventive aspect, however, the data in displays 22, 24 is offset radially outwardly so as to meaningfully plot illegal values that are less than the lower limit. An offset is preferably added to the values in both the component color space of FIG. 2 and in the composite color space of FIG. 1. The plotted points and also the reference values represented by limit lines 52 or 62 or by graticules, are both shifted radially outwardly from the origin by the amount of the offset. This applies even if the lower limit is zero or a negative value. The point is to provide a span of measurement space where illegal values below the minimum limit appear on the same hue or phase line rather than on the diametrically opposite side of the plot (which would occur if the lower limit was at the origin). In the embodiments shown, the component RGB color space has an offset, for example, of 200 mV. Thus the radially inner limit circle 62 represents zero mV and the origin of the plot represents minus 200 mV. Preferably the offset is sufficient that it is not likely that an illegal value will be encountered that is more than the offset amount below the lower limit. In FIG. 2, each of the RGB component color samples shown is legal, i.e., not less than zero nor more than 700 mV, as represented by the limit circles 62.

The composite display in FIG. 1 represents color difference and luminance data, which as mentioned above can range, for example, over 225 levels with a zero excursion quantized as level 128. In the embodiment shown, an offset of 50 units is applied. The innermost legal limit circle represents the legal minimum limit, which can be, for example a quantized as 16 units (namely 128–½*225). However with the additional 50 unit offset in the plot of the data, the origin of the plot corresponds to 50 units lower than the limit circle, or negative 34 quantized units (namely 16–50). The data in the plot are effectively displaced radially outwardly by 50 quantized units so as to provide a radial space of 50 quantized units, between the lower legal gamut limit and the origin of the polar plot, where illegal values can be plotted.

The component RGB display of the equivalent data, shown in FIG. 2, is also offset. Assuming that RGB data legally varies from zero to 700 mV, the innermost limit circle represents zero volts. The data is displaced radially outwardly to provide room to display illegal values down to negative 200 mV.

Figure 3:
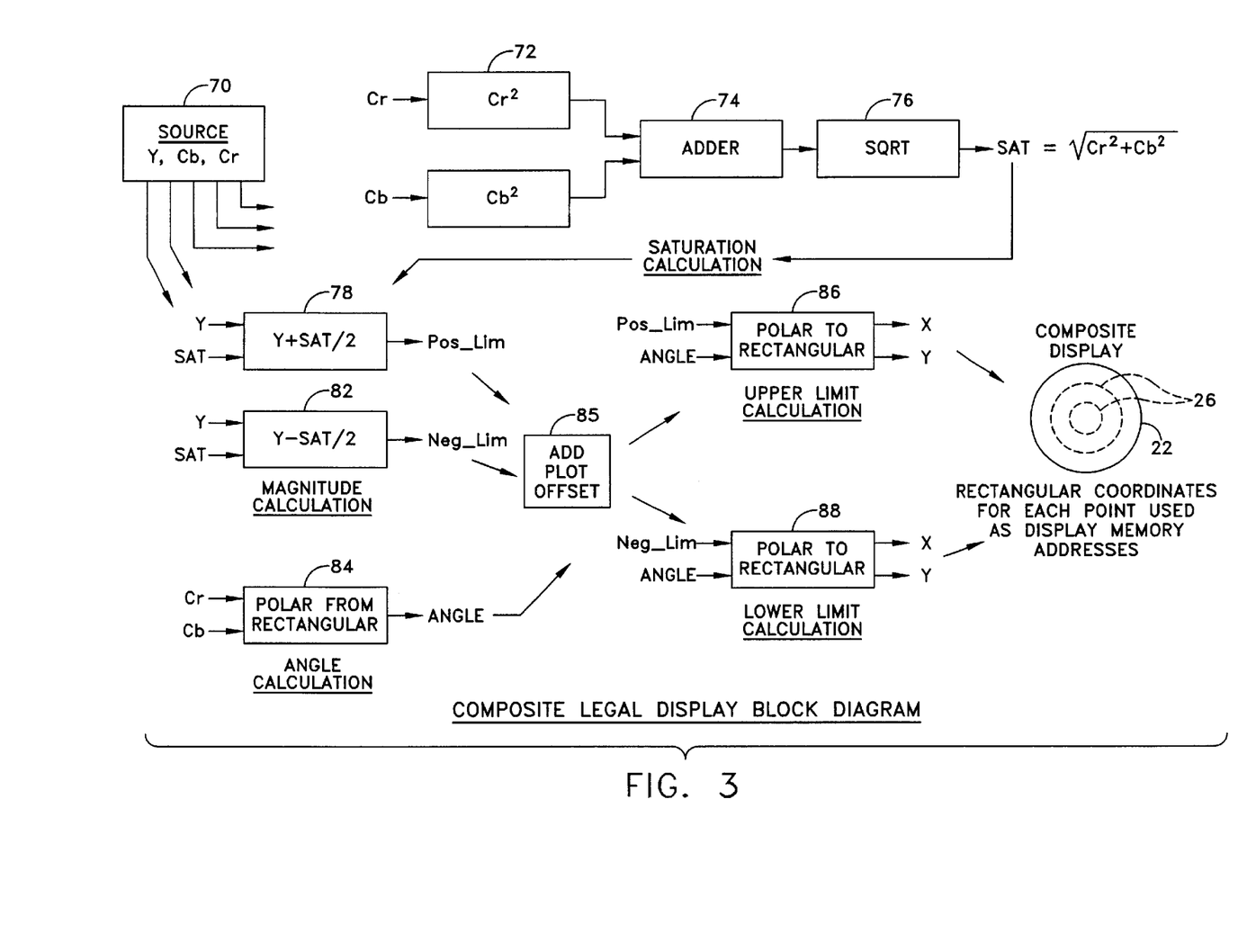
FIG. 3 is a flow chart or block diagram illustrating the generation of a composite display as in FIG. 1 from a source video signal.

FIG. 3 is a block diagram showing the method steps or apparatus elements needed to generate the composite display 22 from a source or input signal 70 which in this case is assumed to be a composite signal comprising luminance and color difference, Y, Cb, Cr. The two color differences Cb, Cr are analogous to the opposite and adjacent sides of a right triangle and in a vectorscope plot can be used to provide the R-Y and B-Y signals that control the vertical and horizontal deflection (see FIG. 7). In YCbCr space, the luminance Y corresponds to a hypotenuse or radial distance from the origin to a plotted point in a vectorscope plot. According to the present invention, the luminance is modulated by the calculated saturation amplitude, to provide two radially spaced points representing the excursion limits. Also the data is displaced radially outwardly by the offset discussed above. The excursion limits 32, 34, which are plotted for the respective hue phase angle, are inner and outer plotted values, radially spaced from one another by a distance proportional to the saturation, and spaced from the origin by a distance representing the sum of the luminance and the offset.

Therefore, as shown in FIG. 3, the hue angle is determined by converting Cb, Cr from rectangular to polar coordinates at block 84. This can include a lookup table function, namely with the hue angle being arctan (Cb/Cr). The luminance is a radial span to be modulated by saturation. The saturation is determined trigonometrically by squaring the color difference values at block 72, adding them at block 74 and determining the square root of the sum at block 76:

$$SAT = SQRT(Cb^2 + Cr^2).$$

The saturation is "modulated" onto the luminance value to provide two points, by centering the radial displacement defined by the saturation, on a point at the radial distance of the luminance:

$$Pos\_Lim = Y + SAT/2$$

$$Neg\_Lim = Y - SAT/2.$$

The Cb and Cr values are proportional to the Cartesian coordinates (i.e., the X and Y displacement) of a graphed point in the polar graph of luminance versus hue phase angle. As shown in FIG. 3, the positive and negative or radially outer and inner excursions are determined at blocks 78, 82 and plotted at blocks 86, 88. The resulting points are radially offset by the headroom space for illegal values at block 85, and the resulting points are shown on composite display 22. The display preferably includes lines such as inner and outer reference circles or similar markings that show the low and high limits of the legal gamut of color variation, respectively.

Figure 4:
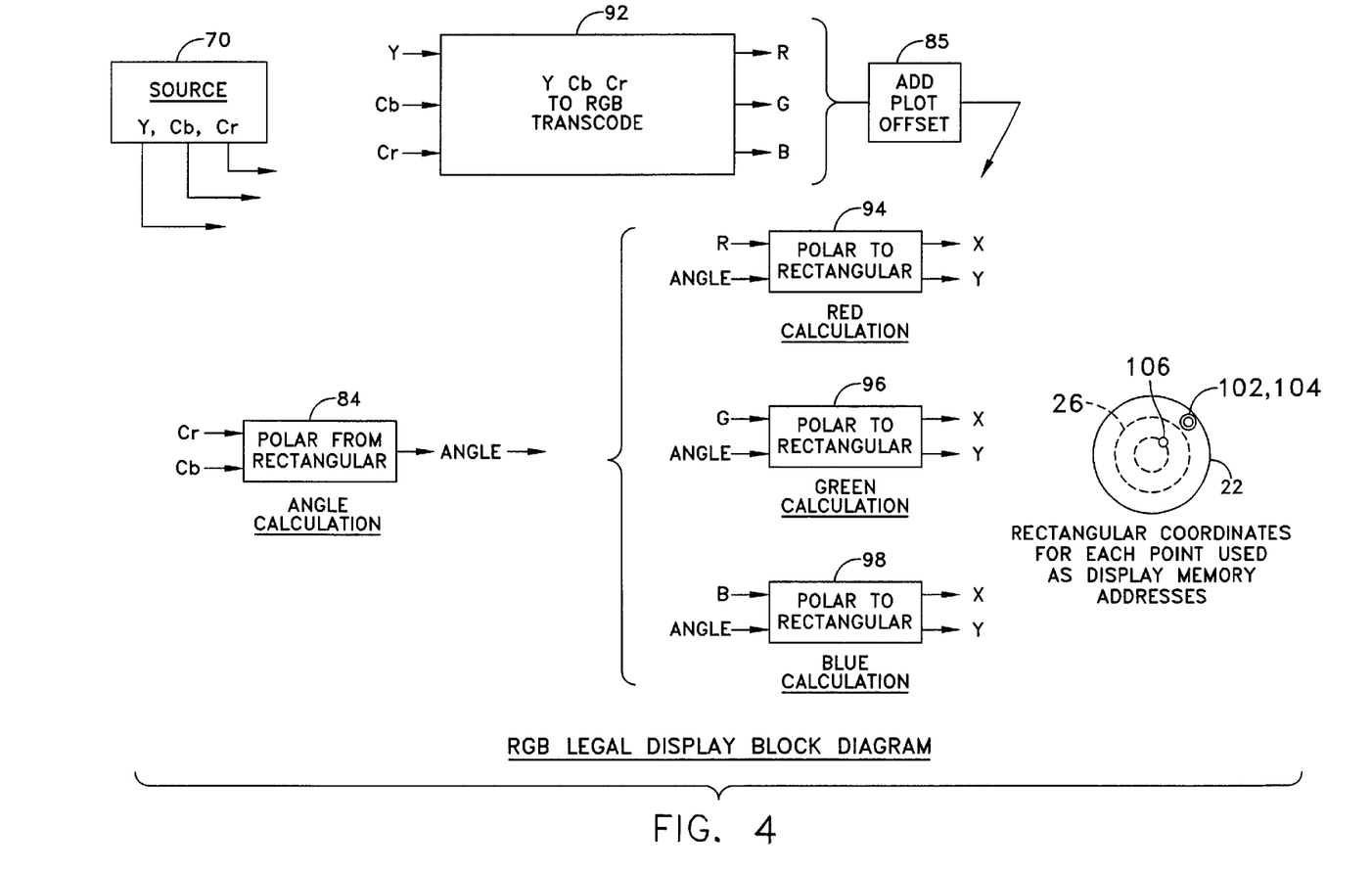
FIG. 4 is a flow chart or block diagram illustrating the generation of a component RGB display as in FIG. 2 from the source video signal.

A video signal may have points that graph within the legal gamut limits according to their values in a composite color space such as Y, Cb, Cr, but generate illegal component colors in RGB color space. In FIG. 4, the video signal is available in both color space values, for example being supplied from source 70 in YCBCR and being converted to equivalent RGB values using transcoder 92. It is also conceivable that a signal in RGB may be supplied by a source (not shown) and transcoded to YCBCR. In any event, both color space characterizations of the video signal are available. In FIG. 4, the R, G, B data values from transcoder 92, which will be plotted as radial distances, are modified by the addition of the headroom offset, and processed to plot in polar coordinates each component color R, G and B as an amplitude (radius) at a corresponding hue phase angle. The hue phase angle can be determined from Cb, Cr as in FIG. 3.

In FIG. 3, the amplitude of each of the three component colors is plotted as a function of hue angle. Depending on the specific hue, the component primary colors are added in different proportions. For each sampled value, there are three plotted points, one each for the primary color components, determined by polar to rectangular converters 94, 96, 98 using the offset RGB values from transcoder 92, as offset at block 85, and the angle determined from CbCr by rectangular to polar converter 84. The result in this case is also a polar plot shown on display 24, with maximum and minimum values that can be marked by concentric circles 26 or the like on the display. Three radial values, namely R, G and B (as offset) are plotted at each hue angle sampled.

Figure 9:
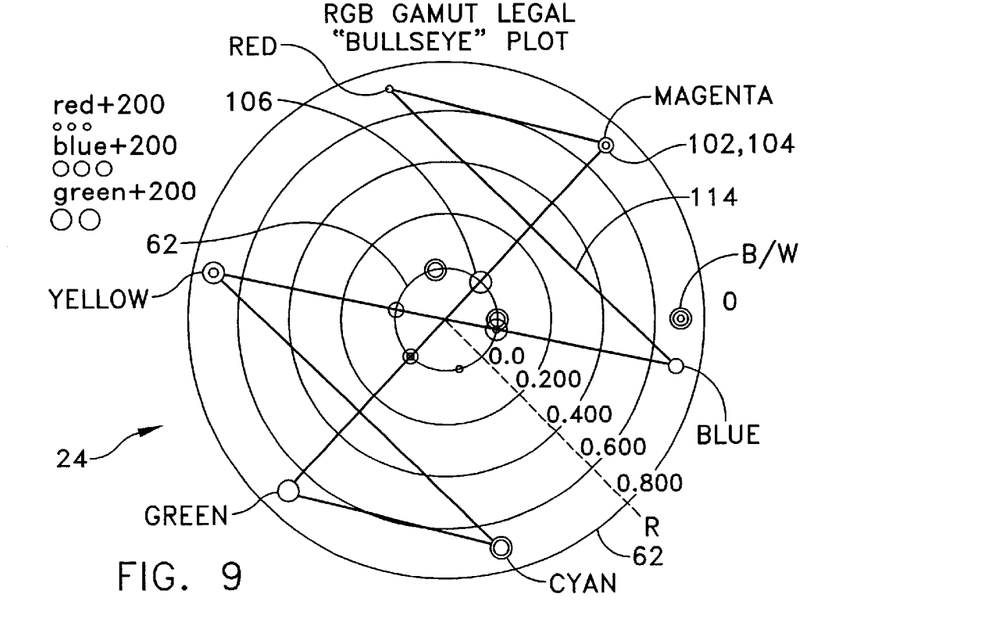
FIG. 9 is a copy of the component display of legal color values in FIG. 2, likewise labeled and marked with reference points for discussion.

In a usual video program with changing scenes and the like, the composite and component plots may be complex and constantly changing. Preferably the operator has controls to select all or part of the video frame for sampling. FIGS. 5–7 show an exemplary test video signal, namely a 100% test bar pattern, and how the signal might appear on a conventional vectorscope. FIGS. 8 and 9 show how such an exemplary signal appears on the polar plots in two color spaces according to the invention.

As shown in FIG. 5, the test pattern appears in on a display screen image 110 as series of vertical bands. The color parameters are constant within each band, and as a result there are a limited number of color values presented (i.e., one set of values for each bar). FIG. 6 shows a corresponding composite signal as it might appear in one horizontal scan line in the test pattern raster. Within each line, the luminance and saturation vary as a function of the displayed color. Various test patters are known, the one shown presenting primary colors or pairs of primary colors, in decreasing luminance order. If displayed on a standard polar plot vectorscope display (FIG. 7), luminance is displayed as the radius and hue as the phase angle. The color difference signals Cb and Cr can be decoded to produce X and Y coordinates for the polar plot or graph.

FIG. 8 shows a plot according to the invention in Y, Cb, Cr composite color space. The respective color data is presented at the same hue phase angles as with a vectorscope. However, the radius is not simply the luminance value. Instead, each radius has two points that equal the high and low extremes 32, 34 of the excursion of the composite signal. FIG. 8 shows that the points plotted as the excursion extremes 32, 34 are shown symmetrically around the luminance value 55, which can also be plotted but preferably is omitted. FIG. 8 also includes radial segments associating the excursion extremes at the respective colors, which segments are also preferably omitted in the display 22. Inner and outer reference circles 52 are included to represent the legal gamut limits. Alternatively, graticule markers may be provided for reference (not shown in FIG. 8).

Inasmuch as a test pattern is demonstrated, the composite display in FIG. 8 appears according to the invention with at least the excursion points 32, 34 plotted for each color. A regular program signal would have many color combinations as well as variations in luminance and saturation, and might appear as a generally annular band 44 between inner and outer extreme lines 53, which are made up of many different excursion points 32, 34. All the excursion points, however, are expected to reside within the gamut error limit circles 52, shown in broken lines. The invention thus readily shows gamut error violations in composite color space.

FIG. 9 represents the same data in an alternate color space, namely in component RGB. In this plot, each distinct color in the test pattern contains three points, one for each component color. The different component points preferably are distinguished by presentation in different display colors (e.g., a red dot for red, a blue dot for blue and a green dot for green). It is also possible to use another attribute such as dot size to distinguish the component colors. The component colors could be indistinguishable (i.e., all the same size and color), and that still would show when a gamut error was encountered. However it is useful when diagnosing a gamut error problem to know whether it is confined to a particular component color or combination, so the points representing the respective components preferably are distinct.

For the bands in the test pattern that correspond to the primary colors red, blue or green, that color is plotted in FIG. 9 at the radial outside of the graph, because for that primary color, the primary color component is at full scale, and the other two color components are at zero (or another minimum value). The test pattern has intermediate colors that are produced by equal combination of two of the primary colors, which are shown at full scale and the third component color is at zero. There are also points for gray, black and white, which have a luminance value but no saturation, because they apply equally to each component color.

Both FIGS. 8 and 9 contain an offset that effectively displaces the plotted points radially outwardly. The offset in FIG. 8 is 50 color difference units, which legally range over a span of 225 quantized units with zero being at 128. The offset is about a fourth of full scale. The offset in FIG. 9 is 200 mV out of a typical legal range of 0.0 to 700 mV. By providing an offset as shown, the invention moves the active portion of the displayed range radially outwardly. As a result, the distance between the origin of the display plot and the lower limit of the legal color gamut for the particular variable is made available for display of illegal values.

FIGS. 8 and 9 both represent the test pattern of FIGS. 5–7, which has a small number of discrete combinations of values in either of the two color spaces represented. In displaying regular programming, the displayed plot varies constantly with the scene and colors displayed. Assuming a generally equal distribution of a wide range of color combinations, the display generally appears as a band around the origin, with a shape and variation in radius around the plot that may correspond generally to the luminance differences among the colors as exemplified by the outline of the test pattern data in FIG. 8. The values nominally remain within inner and outer concentric circles 52 or 62, representing legal variations within the color gamut. In the event of an illegal value, the values fall outside of the concentric circles and appear plainly on the display.

Although the legal gamut values have been exemplified by concentric circles, it would be possible to set the legal limits on values for different colors at different values, in which event the plot of the invention would preferably contain inner and outer lines representing the legal gamut range, but those lines would not be circles.

Accordingly, and in keeping with the above description and the drawings wherein the same reference numbers are used throughout to identify the same elements or functionally similar elements, the invention provides a video display device representing characteristics of an input signal according to at least one and preferably two color space definitions. A decoder 70 samples the input signal and decodes at least two values from the input signal, representing an attribute of the input signal according to the applicable color space definition. The values have a range of variation that typically varies with the hue of the encoded input signal at a time of sampling. In regular programming the signal varies widely.

A polar or vector display 22, 24 depicts the sampled signal, plotting at least the values representing the attribute and defining the range. More particularly, the value of the attribute is represented by a point 32, 34 or 102, 104, 106 at a radius from the origin representing the value and at a phase angle relative to a predetermined zero phase origin that represents the hue.

Preferably the phase angles for particular hues are the same as or similar to the angles conventionally used in vectorscopes, however the displayed attributes or variables are different. The attributes in composite color space can include an excursion (FIG. 6) of the attribute (in that case composite signal amplitude) as a function of hue, namely a span between maximum and minimum values 32, 34. Thus for color difference composite signals, the excursion can represent the peak to peak variation of a hue dependent signal synchronized to the color burst, around a level corresponding to the luminance. Specifically, the saturation SAT as a function of hue is displayed as an excursion 32, 34 between radial extremes on the polar plot, the excursion encompassing the luminance level 55 at the respective hue phase angle. In other words, where the attribute comprises color difference values such as Cb, Cr, the legal range is defined by extremes of variation in the sampled or instantaneous luminance and saturation (together the excursion) as a function of the hue.

According to the invention, two distinct displays 22, 24 preferably are provided, either alternatively or simultaneously, for different color space definitions. For example, a test apparatus can include a presentation of both plots, or alternatively the user can selectively choose one plot or another. An alternative to the composite plot 22 based on luminance and color difference, decodable to luminance, saturation and hue, is a plot 24 based on component color signal amplitudes. In that case the attribute can be the relative amplitude of primary color components R, G and B, combinations of which define the hue. The range of legal values in that case can be the difference in amplitude between at least two of the primary color component values as a function of the hue. Typically the color component amplitudes vary between zero or nearly zero when displaying a complementary color or black, and a maximum or full scale value during display of the respective color or white.

The color gamut or legal range of the attribute value plotted is preferably indicated on the display, for example as a circle at a particular reference value shown on the display screen or plotted together with the attribute data. In any event, at least one marker 52 or 62 is provided at a particular radial distance in the plot corresponding to an attribute value at least at one extreme of the range, and preferably markers for both extremes. The color difference (composite) signal components can be displayed in any color or in a combination of colors, for example using different color lines or dots for displaying the maximum and minimum values in the plot and the high and low legal values.

The plotted data and the legal range are both shown at a radial offset that provides some measurement head room. For example where the attribute has a legal gamut between zero and a full scale value, the data and legal threshold values are displaced toward the full scale side to provide head room to display illegal values that are less than the lower limit of zero. On the high side, the display has room to display a corresponding range of values above the upper limit of the range of legal values.

By presenting a display of sampled parameters of the video input signal in at least two color space definitions, each having its own legal gamut range, the invention provides a useful diagnostic tool. If the particular values are legal in one of the composite or component color space characterizations of the signal but not in the other, the invention shows an excursion beyond the legal limit on the display of that attribute or color space. Moreover, by also displaying or alternatively displaying the alternative color space characterization, it is frequently possible for the operator to determine why in particular the attribute is going out of the color gamut scale. This might be due, for example, to superimposed graphics in a distinct color, switching to a different signal source which has not been screened for color gamut violations or the like. Often the particular cause of the color gamut violation is readily identified.

The particular values that are produced and graphed can be processed in an analog manner, but the calculations also lend themselves to use of a digital processor. The processor in that case can control the display as needed, or can plot the data on a display field that is otherwise processed, such as the display memory of a computer workstation used in controlling the switching of sources or other aspects of video production.

The invention has been described substantially as a test equipment device or apparatus, but can also be regarded as a method for identifying color gamut violations in a video input signal. The violations are identified by decoding the video input signal into variables, preferably in two different color spaces, such as composite color difference excursion, and amplitude of primary color components. Certain of the values that may be legal in one of the two color spaces are a color gamut violation in another of the color spaces. Ranges of the variables are plotted and displayed in at least one of the color spaces, preferably as amplitude radii on a polar vector plot as a function of hue phase angle. The plotted and displayed values are compared to the maximum and/or minimum radii representing the limits of legal color gamut values versus gamut violations. This basic method can be accomplished with the additional steps of simultaneous versus selectable alternative display, display with an offset or headroom space for presenting legal values, representing the legal value limits in alternative ways and other steps as discussed above.

The invention having been disclosed in connection with certain preferred examples and embodiments, variations will now become apparent within the scope of the invention, and reference should be made to the appended claims rather than the foregoing discussion of preferred examples, to determine the scope of the invention in which exclusive rights are claimed.

What is claimed is:

1. A video display device for representing characteristics of an input signal according to a color space definition in which at least three variables define characteristics of pixels of an image displayed from the input signal, the display device comprising:

a decoder operable repetitively to sample the input signal and to decode at least two of said three variables, producing for each sample at least two values versus hue from the three variables, for each sample of the input signal, according to said color space definition, at least one of said two values being variable as a function of a hue value of a respective sample of the input signal;

a vector display operable to depict said signal by plotting said at least two values versus a same phase angle corresponding to the hue value of each said sample, relative to a display origin, in a two dimensional plot wherein the phase angle represents the hue value and said two values plot to distinct radii, representing a radial span defining a range;

wherein the at least two values are selected from the group consisting of luminance-saturation-hue, luminance-and-two-color-differences, and primary color amplitudes; and, wherein the at least two values comprise excursions of one of luminance plus saturation, and primary color values, said plot representing a radial span between points, plotted at the phase angle representing the hue value of each said respective sample.

2. The display device of claim 1, wherein the span represents an excursion defined by a peak variation of the saturation at a radius defined by the luminance of the sample.

3. The display device of claim 1, wherein the at least two values are selected from at least three said primary color amplitudes that are components of the sample, and the radial span represents a difference in amplitude plotted as radial distance between at least two of the primary color amplitudes, said amplitudes being plotted as a function of the hue of the sample.

4. The display device of claim 1, comprising two said vector displays, one of the vector displays presenting luminance and saturation, said plot representing a radial span varying with one of said luminance and saturation, at a radius varying with the other of said luminance and saturation, plotted at the phase angle representing the hue value of each said respective sample, and another of said vector displays presenting primary color amplitudes that are components of the sample, and the radial span represents a difference in amplitude plotted as radial distance between at least two of the primary color amplitudes, said amplitudes being plotted as a function of the hue of the sample.

5. The display device of claim 1, wherein the vector display is switchable between two modes, in one of the modes the vector display presenting luminance and saturation, said plot representing a radial span varying with one of said luminance and saturation, at a radius varying with the other of said luminance and saturation, plotted at the phase angle representing the hue value of each said respective sample, and another of the modes said vector display presenting primary color amplitudes that are components of the sample, and the radial span represents a difference in amplitude plotted as radial distance between at least two of the primary color amplitudes, said amplitudes being plotted as a function of the hue of the sample.

6. The display device of claim 1, wherein the phase angle and the origin of the vector display is substantially equal to that of a vectorscope.

7. The display device of claim 1, further comprising a reference value shown on the vector display, including at least one marker for radial distance for comparison at one extreme of the range.

8. The display device of claim 7, wherein the reference value includes a radially inner extreme of the range and wherein the range is offset above the radially inner extreme, whereby excursion below the inner extreme is depicted.

9. The display device of claim 7, wherein the range has at least one legal limit according to the color space definition and the reference value identifies an excursion beyond the legal limit.

10. An apparatus for presenting sampled parameters of a video input signal that is characterizable according to at least two color space definitions, the color space definitions each having a respective legal gamut range, at least one variable according to one of said at least two color space definitions having a value that is a processed combination of values of at least two variables according to another of said color space definitions, whereof at least one of said two variables is changeable with hue, said value that is a processed combination having at least one legal limit in the legal gamut range and being variable with said values of the at least two variables, the display comprising:

a processor operable to produce a display of the processed combination of values of the at least two variables, wherein the processor is coupled to at least one polar display operable with the processor for presenting a plot of the values of the at least two variables versus hue, at each phase angle representing the hue, thereby producing a plot of two distinct radii at each said phase angle, a radial span between said two distinct radii representing a value of one of the variables of the processed combination, said span being at a radial distance representing a value of another of the variables of the processed combination, whereby violation of the legal gamut range is indicated by part of the span having an excursion beyond the legal limit as a function of said hue;

wherein the processed combination represents an amplitude of a variable in a color space definition and the legal gamut range defines a maximum and minimum value of said variable in the color space definition; and, wherein the at least two variables and the processed combination, respectively, are members of different color space definitions and are each selected from the group consisting of luminance-and-two-color-differences, luminance-saturation-hue, and primary color component amplitudes.

11. The apparatus of claim 10, wherein said variables changeable with hue include color difference and the plot displays luminance and saturation as a function of the hue.

12. The apparatus of claim 11, wherein the excursion is plotted as a span representing peak amplitude variation of a value of the saturation of the sample, around a value of the luminance of the sample, at a phase angle representing the hue of the sample.

13. The apparatus of claim 12, wherein the display is operable to present the peak variation of the value of the saturation of the sample, above and below the luminance of the sample, simultaneously or alternately with a relative amplitude of primary color components of the sample, in each case at a phase angle representing hue.

14. The apparatus of claim 10, wherein the processor is operable to offset the plot radially outwardly, whereby the plot shows any violation of the legal gamut range below a predetermined low limit as a span extending into a radial space between an origin of the plot and the low limit.

15. The apparatus of claim 10, wherein the display includes at least one circle concentric with the polar display, for representing a boundary of the legal gamut range.

16. A method for identifying color gamut violations in a video input signal, comprising the steps of:

providing video sample data comprising three variables for each sample for at least one color space definition wherein at least one of the three variables varies as a function of hue, and the three variables are transcodable with three variables in at least one other color space definition, and wherein certain values of the variables that are legal in one of the two said color space definitions transcode to a color gamut violation in another of the color space definitions;

plotting at least two of the variables versus hue, in at least one of said color space definitions as amplitude radii on a polar vector plot as a function of a hue phase angle, wherein at least two distinct points are thereby plotted for each said sample, having a given hue phase angle and at least two potentially unequal radii at said hue phase angle;

comparing the amplitude radii plotted for said at least two variables in the at least one of said color space definitions to at least one of maximum and minimum radii representing the color gamut violations in said another of the color space definitions;

wherein said plotting comprises one of producing said polar vector plot for at least said two color spaces simultaneously and displaying said polar vector plot for both said color spaces, and producing said polar vector plot alternatively for at least said two color spaces, and selectively displaying the polar vector plot for one of said two color spaces at a time; and, wherein said plotting of said at least two of the variables in said at least one of the color spaces comprises radially superimposing a plotted value of one of said at least two of the variables on another of said at least two variables thereby providing a radial excursion that varies with both said at least two variables, and wherein a color gamut violation occurs when the radial excursion is greater or less than a predetermined radius.

17. The method of claim 16, further comprising offsetting the amplitude radii outwardly on the polar vector plot by an offset, and wherein said comparing includes detecting a color gamut violation wherein the amplitude is below a minimum value by an amount less than the offset, whereby the color gamut violation plots to an area between an origin of the polar vector plot and the offset.

* * * * *